United States Patent
McConathy

(10) Patent No.: US 12,443,791 B2
(45) Date of Patent: Oct. 14, 2025

(54) VISUAL ANALYSIS FOR DOCUMENT IMPORT

(71) Applicant: Open Text Holdings, Inc., Menlo Park, CA (US)

(72) Inventor: Nathaniel McConathy, Lexington, KY (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 91 days.

(21) Appl. No.: 18/480,282

(22) Filed: Oct. 3, 2023

(65) Prior Publication Data

US 2025/0111138 A1 Apr. 3, 2025

(51) Int. Cl.
| | | |
|---|---|---|
| G06F 40/00 | (2020.01) | |
| G06F 40/186 | (2020.01) | |
| G06V 30/18 | (2022.01) | |
| G06V 30/412 | (2022.01) | |
| G06V 30/416 | (2022.01) | |

(52) U.S. Cl.
CPC ...... *G06F 40/186* (2020.01); *G06V 30/18105* (2022.01); *G06V 30/412* (2022.01); *G06V 30/416* (2022.01)

(58) Field of Classification Search
CPC ............ G06F 40/186; G06V 30/18105; G06V 30/412; G06V 30/416
See application file for complete search history.

(56) References Cited

U.S. PATENT DOCUMENTS

| | | | |
|---|---|---|---|
| 6,332,046 B1 * | 12/2001 | Fujimoto | G06V 30/414 |
| | | | 382/289 |
| 9,201,854 B1 | 12/2015 | Kloiber et al. | |
| 9,715,624 B1 * | 7/2017 | Fang | G06V 30/413 |
| 9,727,293 B1 * | 8/2017 | White | G06F 7/10 |
| 10,223,339 B2 | 3/2019 | Pruitt et al. | |
| 10,346,706 B2 * | 7/2019 | Nonaka | G06V 20/56 |
| 10,430,927 B2 * | 10/2019 | Ozawa | G06V 30/18076 |
| 10,733,433 B2 * | 8/2020 | Krishnapura Subbaraya ............... |
| | | | G06V 30/412 |
| 11,010,543 B1 * | 5/2021 | Wesanekar | G06V 30/412 |
| 11,582,170 B2 | 2/2023 | Downs et al. | |
| 2002/0006220 A1 * | 1/2002 | Kohchi | G06V 30/413 |
| | | | 382/165 |
| 2004/0001628 A1 * | 1/2004 | Ozawa | G06V 30/414 |
| | | | 382/187 |
| 2006/0291877 A1 * | 12/2006 | Silvestri | G03G 15/5037 |
| | | | 399/26 |
| 2007/0186152 A1 * | 8/2007 | Gurcan | G06F 40/103 |
| | | | 715/209 |
| 2008/0170784 A1 * | 7/2008 | Guerzhoy | G06T 7/12 |
| | | | 382/173 |
| 2012/0155745 A1 * | 6/2012 | Park | G06V 20/176 |
| | | | 382/154 |
| 2016/0063322 A1 * | 3/2016 | Déjean | G06V 30/40 |
| | | | 382/176 |
| 2019/0354584 A1 * | 11/2019 | Wallenfelt | G06V 20/62 |

(Continued)

*Primary Examiner* — William L Bashore
*Assistant Examiner* — David Faber
(74) *Attorney, Agent, or Firm* — Sprinkle IP Law Group

(57) ABSTRACT

Embodiments of the present disclosure extract a layout from a digital image of a document, including performing an analysis of image data to identify areas of content based on a plurality of test lines of pixels in multiple directions and storing the identified areas as design elements of an electronic document template.

21 Claims, 12 Drawing Sheets

(56) References Cited

U.S. PATENT DOCUMENTS

2021/0303905 A1\* 9/2021 Baek .................... G06V 30/153
2024/0346662 A1\* 10/2024 Reddy .................. G06V 10/762

\* cited by examiner

| Customer Number: V_Cust_Num | Choose Branding:  ⦿ Black  ○ Blue | Image |

| Choose Branch Location: V_Cust_Branch | Extreme Health Insurance |
| | V_Branch_Street |
| | V_Branch_State |

To:

V_Cust_Full

V_Cust_Street

V_Cust_State

☐ Email Delivery Required

Select Paragraph: Custom

Dear: V_Cust_Title V_Cust_Last

Re: V_Insurance_Type Insurance

I understand that you are looking for information regarding existing insurance coverage. We are committed to helping employers manage their health-care costs, guiding consumers to make informed decisions, and giving back to the communities we serve. We look forward to hearing back from you and we hope you find the provided material informative and appealing to your needs.

We know that insurance matters can sometimes be confusing. So we have tried to organize this important package of information as simply as possible. Please add this package to your other insurance papers in a convenient place for reference We know that insurance matters can sometimes be confusing. So we have tried to organize this important package of information as simply as possible. Please add this package to your other insurance papers in a convenient place for reference.

V_Cust_First, I value our relationship and look forward to continuing to serve you. If you have any questions or need additional information, I will be glad to assist you.

Sincerely,

Image

V_Agent_Name

FIG. 2

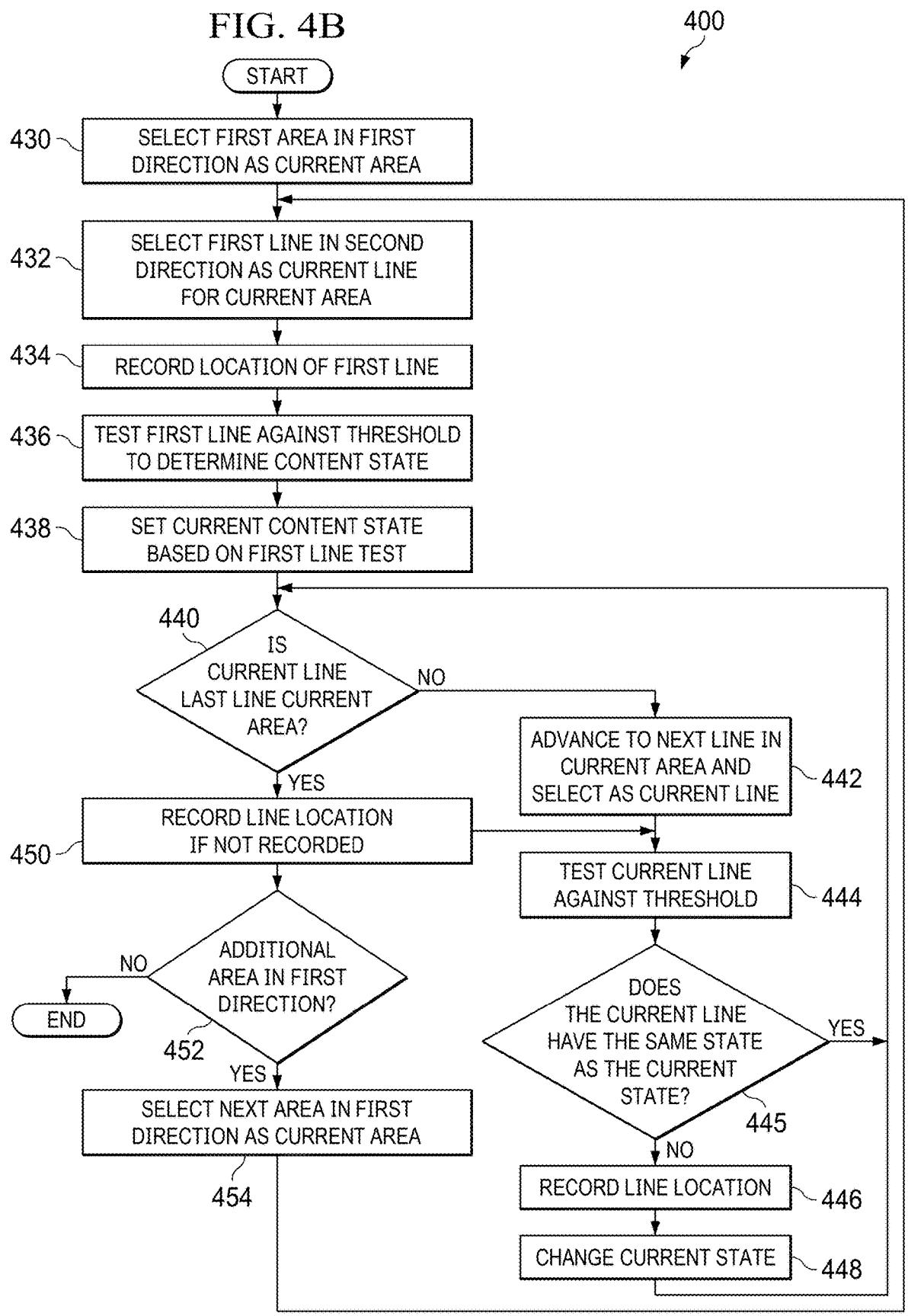

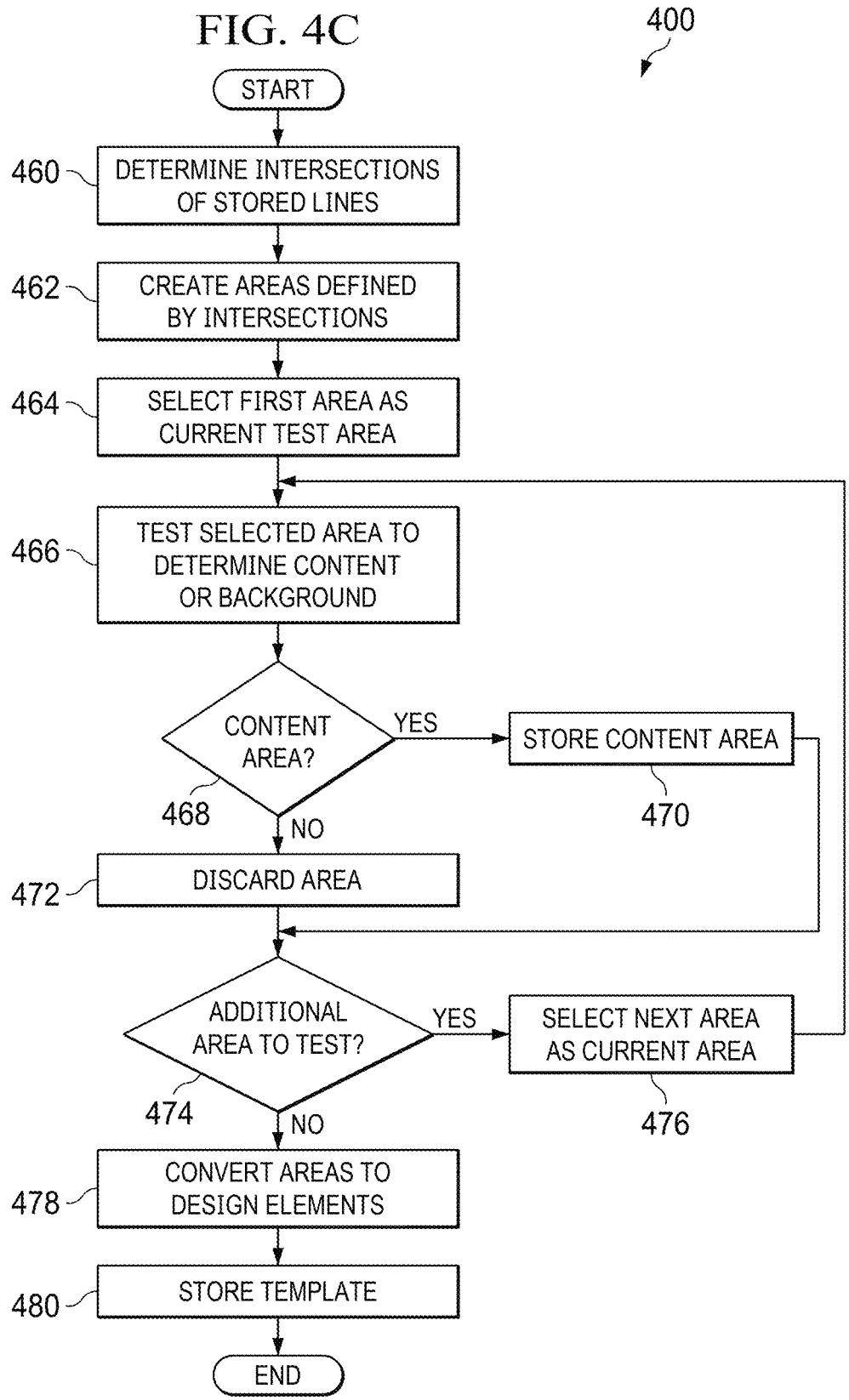

FIG. 5A

September 28, 2022

Joe D. Doe
456 Oak Avenue
Metro City, NY 12345-6789

Your Elevate Healthcare Agent
John Smith
505 University Avenue
Suite 200
Elevation Park, NC 12345
(123) 444-2345
jsmith@elevate.com

Policy Number: 111111111

Dear Joe,

I understand that you are looking for information regarding existing insurance coverage. *Elevate Healthcare* is committed to helping employers manage their health care costs, guiding consumers to make informed health and benefits decisions, whilst giving back to the communities we serve.

We look forward to hearing back from you and hope you find the provided product information material for the following products informative.

Group Health Insurance. Discover affordable health benefits and insurance plans that are easily customized to meet your needs. You can choose from a variety of options, like traditional or consumer-directed plan designs.

Health Savings Accounts. *Elevate Healthcare* makes healthcare saving accounts easy for Employers to administer and our integrated debit card gives members convenient access to their funds.

Group Medicare. When you choose *Elevate Healthcare*, you benefit from more than two decades of experience with Medicare, as well as our wide choice of products and flexible plan designs.

Prescription Drug Benefits. *Elevate Healthcare* pharmacy benefits manage employer costs through innovative plan designs emphasizing cost transparency and choice.

Joe, I value our relationship and look forward to continuing to serve you. If you have any questions or need additional information, I will be glad to assist you. Thank you for your patience in this matter.

Sincerely,

*John Smith*

*Elevate Healthcare*

*Your policy activity summary*

| HSA Contributions | | $3500 |
|---|---|---|
| Premium | | $7843 |
| | YTD Total | 11343 |

Elevate Healthcare | 789 Medical Drive | Health City, USA 98765 | www.elevate.com | 1-877-333-4444

FIG. 5B

September 28, 2022    Your Elevate Healthcare Agent
Joe D. Doe               John Smith
456 Oak Avenue        505 University Avenue
Metro City, NY 12345-6789    Suite 200
                      Elevation Park, NC 12345
                      (123) 444-2345
Policy Number: 111111111    jsmith@elevate.com

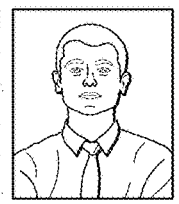

Dear Joe,

I understand that you are looking for information regarding existing insurance coverage. *Elevate Healthcare* is committed to helping employers manage their health care costs, guiding consumers to make informed health and benefits decisions, whilst giving back to the communities we serve.

We look forward to hearing back from you and hope you find the provided product information material for the following products informative.

Group Health Insurance. Discover affordable health benefits and insurance plans that are easily customized to meet your needs. You can choose from a variety of options, like traditional or consumer-directed plan designs.

Health Savings Accounts. *Elevate Healthcare* makes healthcare saving accounts easy for Employers to administer and our integrated debit card gives members convenient access to their funds.

Group Medicare. When you choose *Elevate Healthcare*, you benefit from more than two decades of experience with Medicare, as well as our wide choice of products and flexible plan designs.

Prescription Drug Benefits. *Elevate Healthcare* pharmacy benefits manage employer costs through innovative plan designs emphasizing cost transparency and choice.

Joe, I value our relationship and look forward to continuing to serve you. If you have any questions or need additional information, I will be glad to assist you. Thank you for your patience in this matter.

Sincerely,

*John Smith*
*Elevate Healthcare*

Your policy activity summary

| | | |
|---|---|---|
| HSA Contributions | | $3500 |
| Premium | | $7843 |
| | YTD Total | 11343 |

Elevate Healthcare | 789 Medical Drive | Health City, USA 98765 | www.elevate.com | 1-877-333-4444

VISUAL ANALYSIS FOR DOCUMENT IMPORT

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records but reserves all other copyright rights whatsoever.

TECHNICAL FIELD

This disclosure relates generally to the management, development, editing, deployment and communication of content. More particularly, this disclosure relates to analyzing documents to create templates.

BACKGROUND

Ever since the advent of computer networks (including the Internet), enterprise environments have been steadily growing more complicated, encompassing an ever-expanding amount of increasingly complex digital assets (or just assets). A digital asset, in essence, is anything that exists in a binary format that may exist in the enterprise environment or otherwise be utilized by the enterprise. The digital assets of an enterprise may thus include a variety of digital content (content) including text, images, aural or video content, templates used in content delivery or other types of content. For purposes of this disclosure, the term content will be used interchangeably with the term asset and understood to have the same definition as an asset.

In an enterprise environment, these assets may be widely distributed and used for a wide variety of purposes in association with that enterprise. To aid in managing and using their various assets, many enterprises have employed a number of content management systems, such as digital asset management (DAM) systems, content management systems (CMS), web content management (WCM) systems, enterprise content management (ECM) systems, etc. The distribution of content across an enterprise in these various management systems, along with widespread and distributed use of such content, therefore, results in an extremely complex web of interconnectivity involving hundreds or sometimes thousands of systems or people.

Enterprises (e.g., almost any profit or non-profit entity such as a service company, an insurance company, bank, utility company or another type of entity) often communicate with their customers and other entities via multiple communications channels. For example, an enterprise may interact with a customer by sending documents by print mail and as an electronic document by email, while also making the document available to the customer on a web portal. While the types of content management systems discussed above are useful in creating, versioning and controlling access to content, they do not provide a convenient mechanism to integrate such content in outbound communications across multiple channels.

Customer communication management (CCM) solutions allow enterprises to interact with their customers and other entities through multiple channels in some cases. CCM systems can provide an enterprise with an application to improve outbound communications with their distributors, partners, regulatory bodies, customers, or others. Such CCM systems may allow an enterprise to improve the creation, delivery, storage or retrieval of outbound communications, including communications used for marketing, new product introductions, renewal notifications, claims correspondence, documentation, bill statements, advertising, payment notifications, etc. These communications can occur through a number of output channels including email, Short Message Service (SMS), web pages, mobile applications, and other channels.

Some CCM solutions generate individualized communications using electronic templates. For example, a CCM solution might populate a template offer letter with individualized data to create individualized offer letters for print or electronic distribution.

One aspect of creating a template is defining the layout of the page. The layout specifies the arrangement of design elements (e.g., text, images, style) for a page (or other unit of content). The template designer can populate the design elements or leave the design elements to be populated later.

Generating templates, however, is a time consuming and error prone task. For example, many people, especially those not familiar with principles of graphic design, struggle to layout design elements in an aesthetically pleasing way.

Improved methods of template layout design are needed.

SUMMARY

Customer communications management (CCM) solutions rely on electronic templates that can be used to generate individualized communications on a particular channel or across channels. For example, an enterprise using a CCM solution may define a template offer letter that the CCM solution populates with individualized data to generate print documents or electronic communications.

Generating templates, however, is a time consuming and error prone task. Embodiments of the present disclosure provide mechanisms for importing layouts from existing documents into templates, thereby reducing the time required to generate a template.

One aspect of the present disclosure includes a computer-implemented method for automated visual analysis of documents to generate digital templates. The method can include accessing a digital image of a document page, accessing a background color definition, tracking a current content state for analyzing the digital image, where the current content state has a plurality of potential states, testing a first plurality of test lines of pixels from the digital image against the background color definition to identify, from the first plurality of test lines of pixels, plurality of content state transition lines that extend in a first direction, testing a second plurality of test lines of pixels from the digital image against the background color definition to identify, from the second plurality of test lines of pixels, a plurality of content state transition lines that extend in a second direction, identifying intersections between the content state transition lines, determining an area of interest bounded by intersecting content state transition lines, processing the area of interest to determine that the area of interest represents content, and based on a determination that the area of interest represents content, storing the area of interest as a design element of a digital page template.

Some embodiments further include selecting a first area of the digital image, the first area bounded by a first line in the first direction and a second line in the first direction, the first line in the first direction and the second line in the first direction being adjacent lines from the first plurality of content state transition lines, where the second plurality of test lines of pixels extend from the first line in the first direction to the second line in the first direction. The area of interest is a sub-area of the first area.

According to one aspect of the present disclosure, determining that the area of interest represents content comprises testing pixel values from the area of interest against the background color definition.

The background color definition can comprise a color value. Testing the first plurality of test lines of pixels from the digital image against the background color definition can include determining, for each of the first plurality of test lines of pixels a respective variance from the color value and determining a respective content state based on the respective variance from the color value determined for that line.

Embodiments may further include changing the current content state for each of the first plurality of test lines of pixels for which the respective content state determined for that line differs from the current content state.

Testing the second plurality of test lines can include determining, for each of the second plurality of test lines of pixels, determining a respective variance from the color value and a respective content state based on the respective variance from the color value determined for that line.

Some embodiments include changing the current content state for each of the second plurality of test lines of pixels for which the respective content state determined for that line differs from the current content state.

Determining that the area of interest represents content includes, in some embodiments, determining a color variance of pixels in the area of interest from the background color value, and determining that the color variance of pixels in the area of interest exceeds a threshold.

According to some embodiments, determining that the area of interest represents content comprises inputting the area of interest to a machine learning model trained to identify content.

Other aspects of the present disclosure include related systems and computer readable media.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 2 is a diagrammatic representation of one embodiment of designing a document page template;

FIG. 4B is a flow chart illustrating another portion of one embodiment of a method for visual analysis;

FIG. 4C is a flowchart illustrating another portion of one embodiment of method for visual analysis;

FIG. 5A is a diagrammatic representation of a digital image of a document page used to import a layout;

FIG. 5B is a diagrammatic representation of one embodiment of a digital image with content state transition lines in a first direction identified;

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure utilize automated processes to suggest or create template layouts from existing documents. For example, embodiments can analyze images of existing pages to import the layouts from those pages into CCM templates. As such, if a user finds a document with a layout that they like, the user might utilize an embodiment of the present disclosure to import the layout of that document into an electronic template. As another example, embodiments described herein can be used to analyze images of scanned documents to import layouts from the scanned documents into a computer system.

As discussed above, an enterprise may integrate a customer communication management (CCM) system to address the need for multi-channel communication. A CCM system may allow a user to define templates for rendering customer communications on one or more channels (e.g., email, SMS, web page, print, PDF). Templates may specify static content as well as the content that can change based on customer data or other data and how content behaves (e.g., reflows or otherwise behaves). Such templates may include variables and have associated logic. A CCM system may process a template to render customer communications from the template.

Embodiments of the present disclosure can be utilized to import layouts into a variety of computer systems, including, but not limited, systems that use templates to create conversation-enabled documents, such as described in U.S. Pat. No. 11,582,170, entitled "Conversation-Enabled Document System and Method," filed Jun. 30, 2021, which is hereby fully incorporated by reference herein.

Figure 1:
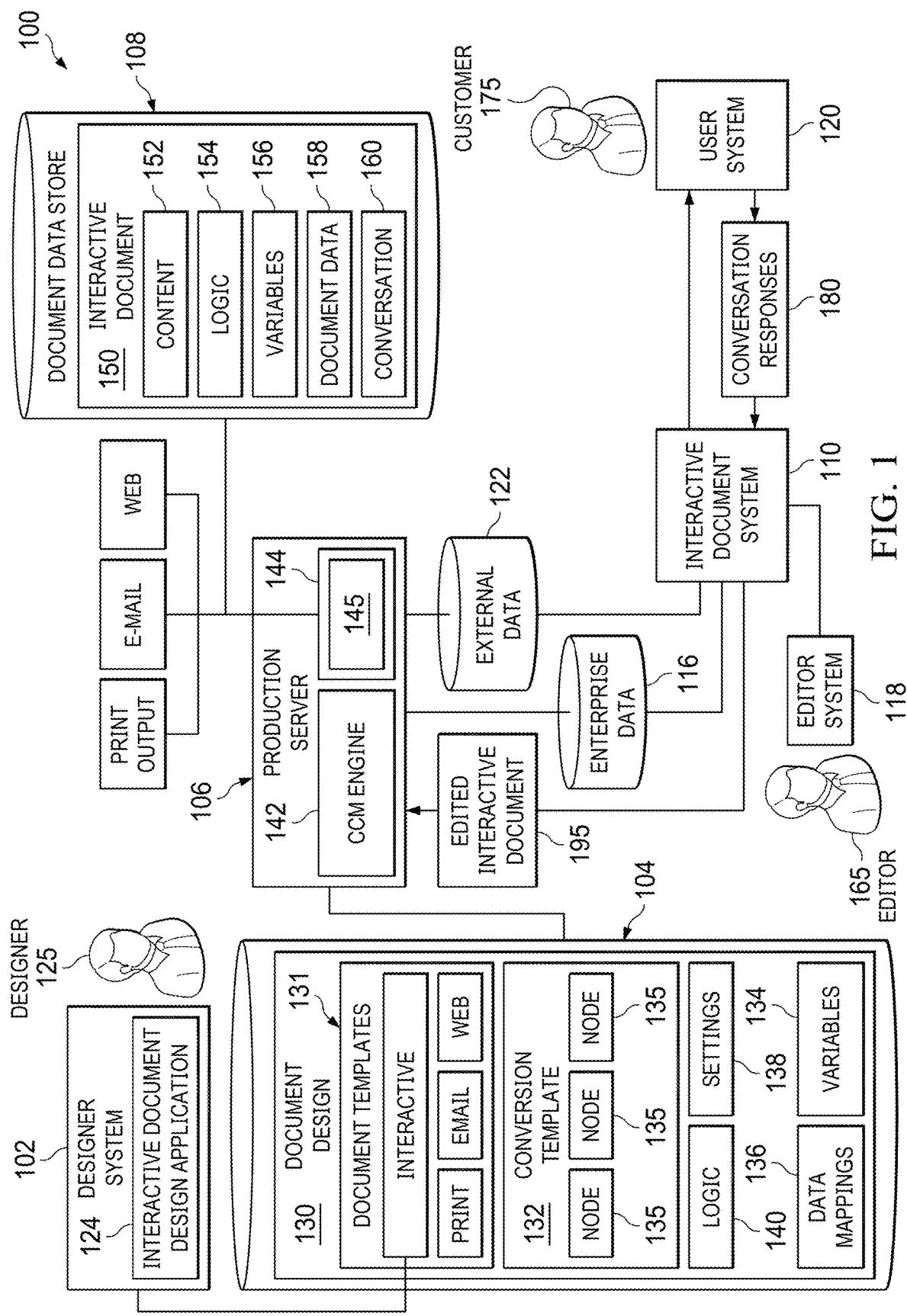
FIG. 1 is a diagrammatic representation of one embodiment of a computer implemented system.

Referring then to FIG. 1, one embodiment of a computer implemented system 100 is depicted. System 100 includes an enterprise CCM environment that includes a designer system 102, a design data store 104, a production server 106, a document store 108, an interactive document system 110, an enterprise data source 116 and an editor system 118. System 100 further includes a user system 120 and an external data source 122. Enterprise data source 116 may comprise a plurality of data sources including, but not limited to, digital asset management (DAM) systems, content management systems (CMS), web content management (WCM) systems, enterprise content management (ECM) systems, or other data source. Similarly, external data source 122 may comprise a plurality of external data sources. System 100 may be a distributed, networked computing environment comprising a plurality of computing systems or applications coupled through a network. The network may be the Internet, an intranet, a wireless or wired network, a local access network (LAN), a wide access network (WAN), a cellular network or some combination of these types of networks, or another type or types of networks.

The enterprise CCM environment implements a design environment that allows designers to create document designs that can be manifested across multiple channels. To this end, the enterprise CCM environment includes a designer system 102 that runs a design application 124 to provide the design environment in which designers (e.g., designer 125) can create document designs. Design application 124 may be, for example, a resident application at the designer system 102, such as a desktop application, or may be a web-based application. According to one embodiment, design application 124 provides an object-oriented design environment in which components of a design are represented by objects. Document designs created by design application 124, such as document design 130, may be stored to a design data store 104.

In a design phase, a designer 125 (e.g., users at an enterprise) may create various document templates, such as document template 131. A document template can include a number of assets (e.g., other content items, including other templates), where each of these content items may be from one or more other distributed network locations such as a DAM system, WCM system or ECM system within that enterprise. A CCM system may use the template to generate a communication for a user associated with the enterprise (e.g., a customer, an agent) and deliver that communication in a format and through a communication channel associated with that user (e.g., as determined from a user or customer database). It is common for enterprises to have hundreds of thousands of document templates for use in their CCMs, where these templates can generate millions of communications per month or more.

The design application 124 may thus present the user with a graphical interface at the user's computing device (e.g., designer system 102) to allow the user to design and select content items in content management systems for inclusion in a created document template and to specify which areas of the document template may accept content or where content may otherwise be changed, added, removed or edited. The design application 124 may also allow the designed document template to be saved in a content management system of the enterprise such that the template may be managed as content of the enterprise.

The design phase, according to one embodiment, is not merely an edit phase, but is an application type development environment where document designs are created as document applications. Design 130 may include all of the design objects and their property settings that make up a statement, letter, invoice, bill or other customer communication. In some embodiments, design 130 sets a framework of how objects and portions of documents generated from design 130 are presented as well as the rules governing that presentation, thus setting the overall appearance of communications to end-users. Design 130 may also define the data sources available and the rules governing their selection, as well as the access and authentication regarding user ability to change certain content elements and access to any or all available data sources.

Design 130 provides an abstract description for how end-user communications should appear. Design 130 describes the overall layout of the communications and defines which parts of an end-user communication will contain static information, such as standardized text, and which parts of the end-user communication will be filled according to rules. Design 130 can specify editable and viewable text, optional and selectable paragraphs, variables, values for variables or text areas, sources for content (e.g., values of variables, text for text areas, images), rules for populating content, resource rights, and user rights, among others.

Design 130 can comprise document templates for multiple forms of customer communication across various channels (e.g., templates for print, web, email, interactive document or other channels). A single document design 130 may include any number of document templates. For example, an enterprise may have hundreds of correspondence letter templates and a single document design 130 can contain all these templates.

A document template (e.g., document template 131) may be used to generate customer communications having one or more pages. To this end, a document template may include page templates for email, print, customer-facing web pages, interactive document pages or other output, where the page templates specify the content, layout, and formatting for an end-user customer communication.

The layout of a page specifies the arrangement of design elements (e.g., text, images) in a page. For example, the layout specifies the absolute or relative sizes and positions of various design elements in a page. The layout may also, in some embodiments, specify the content type for the design element (e.g., image, text, or another type of design element). In the layout, the design elements are not necessarily associated with the content that will populate the design elements. For example, a layout might specify the size and position of a text area in a page but leave the text area to be populated in later steps. In some embodiments, the layout includes positions, dimensions, position orderings. For example, in one embodiment, a rectangular layout includes the position and dimensions of the design element. A non-rectangular layout, in one embodiment, includes multiple positions and position ordering. Layouts for design elements may also specify features, such as, but not limited to background color, type of content (text, image, line, etc.), data source for the element, controls on when the element should appear, calculations related to the element.

A page template can specify editable and viewable text for a page, optional and selectable paragraphs for the page, variables, values for variables or text areas of the page, sources for content of the page, rules for populating content of the page, resource rights for the page, and user rights for the page, among others.

A page template can thus specify the overall layout of an individual page, which parts of the page will contain static information, which parts will be filled according to rules, and how content on a page behaves (e.g., reflows or otherwise behaves). A page template for an interactive document may further specify which portions of the page are editable by an editor-user.

Page templates can reference associated styles, logic, variables or other objects. For example, a page template may reference a style sheet. While a single design 130 may contain many page templates and styles, a design 130 may also contain relatively few templates and styles (e.g., a single page template) with zero or more styles. The content and layout specified by design 130 may be in accordance with specifications provided by the enterprise.

In some embodiments, designer 125 can design a conversation-enabled document that includes a conversation component for controlling a conversation interface into the document. To this end, designer 125 can add a conversation design to document design 130. In one embodiment, designer 125 at designer system 102 utilizes design application 124 to design the conversation. Designer 125 can use the same suite of tools as he or she would use to design other templates and can reuse content, variables and variable data used by other templates or designs.

Designing a conversation may include designing a conversation template, where the conversation template includes a set of node templates representing the steps of a conversation. The design application 124 may thus present the user with a graphical interface at the designer system 102 to allow the user to design and select content items in content management systems for inclusion in the created conversation templates and node templates and to specify which steps of a conversation may accept content and at which steps content may be added, changed, etc. The design application 124 may also allow the designed conversation templates and node templates to be saved in a content management system of the enterprise such that the templates may be managed as content of the enterprise.

Designer 125 may thus create node templates that correspond to conversation steps and create a conversation template that includes node templates. A conversation template can map out a finite state machine for a conversation that, potentially, comprises many states. Given any state there can be certain triggers to move to the next state. The conversation at any point can query for different data from the conversation-enabled document or other data sources and provide possible answers.

Document design 130 may thus include conversation template 132 and node templates 135. Conversation template 132, according to one embodiment, is an abstract design of an automated conversation and defines the finite state machine, including the overall content and logic, of an automated conversation.

Conversation template 132, according to one embodiment, specifies content to output for conversation states, data to collect for conversation states and triggers between states. By way of example, conversation template 132 specifies prompts, variables, data types, messages to provide when particular events occur, rules on responses, validation, routing or other aspects of a conversation.

More particularly, according to one embodiment, conversation template 132 comprises a plurality of node templates 135, where each node template corresponds to a step in a conversation. For each node template, designer 125 can configure various aspects of a conversation step. A node template can specify, for example, a prompt for a conversation step, variables that receive data at the conversation step, data that is expected to be received from a conversation participant at the conversation step, variables that provide data to the conversation step, a "do not understand" message for the conversation step, rules on responses, validation rules, routing logic or other information.

In general, a prompt defines the text, audio or other output that a conversation platform (e.g., chatbot, voice assistant, IVR system) should output for a step in a conversation. Prompts may be simple text or can incorporate variables and logic so that the prompt may vary based on context. In some cases, a node may include multiple prompts, including, but not limited to an entrance prompt or an exit prompt for the node.

As discussed above, a prompt may include variables or logic. For example, a prompt may include various prompt options and logic to select a prompt option based on the value of a variable. For a system that supports audio-based conversations, a prompt may include an audio file in addition to or as an alternative to text.

A node template may also specify variables to which response data received from a conversation participant at a step is to be written and the data type expected to be received for the variable (number, enum, string, etc.). In some embodiments, the designer may specify a finite list of participant response options, such as an indexed list, and the variable to which a user selection of a response option is to be written. For a system that supports audio conversations, response options may be provided as audio files in addition to or as an alternative to text.

A node template can specify a "do not understand" message for a conversation step. The "do not understand" message is a message to be provided if the conversation participant response data received during a step is not the proper data type for the variable specified to receive that date, the conversation participant response data cannot be validated, or the conversation participant response data is otherwise not considered understandable based on a rule. For a system that supports audio conversations, a "do not understand message" may be provided as an audio file in addition to or as an alternative to text.

A node template may specify rules on responses. Rules on responses may include rules to execute based on a conversation participant's response, such as the conversation participant's selection of a response option at a conversation step. A rule on a response may include code to execute. For example, if a node includes the participant response option "Why did my bill go up," the node may include an associated rule on response that comprises code to make a web service call to an enterprise application for data related to the participant's bill and code to determine a reason why the conversation participant's bill went up.

A node template may specify validation rules that include expressions or code to validate conversation participant response data.

A node template may specify routing logic that comprises rules regarding which node to route to next. A routing rule may include, for example, an expression or code.

In some embodiments, a conversation template 132 is embodied as a conversation object that references a plurality of node objects. For example, the conversation template and node templates may be persisted as JavaScript Object Notation (JSON) objects.

A conversation-enabled document design 130 may include supporting data used to support creating a document from design 130. Design 130 may include, for example, a list of variables 134 referenced in design 130, data mappings 136 mapping data sources to variables (e.g., mapping data from enterprise data source 116, external data source 122 or other data to variables), settings 138 for which types of outputs can be generated, and logic 140 (e.g., how to process incoming data and other logic). In some embodiments, a data mapping 136 may map a variable to a data source, where the data source is a file containing records or other data pulled from enterprise data source 116 or external data source 122.

Once design 130 has been finalized it can then be used in production. To this end, production server 106 provides a CCM engine 142 that processes the document's abstract design description (design 130) and produces a conversation-enabled document 144 that includes a conversation component 145. Specifically, CCM engine 142 may evaluate the design 130 to determine the content referenced by the templates 131, 132, 135, retrieve the referenced content from enterprise data source 116, external data sources 122 or other data source and render this content into conversation-enabled document 144 that includes a conversation component 145, such as a representation of template 132 (including node templates 135).

Processing of design 130 can include, for example, pulling sourced data into conversation-enabled document 144. Sourced data can be pulled into the conversation-enabled document 144 through network connections to enterprise data source 116, external data source 122, or other information sources. Of course, the data, whether from enterprise data source 116, external data source 122, or from another data source, could be content such as text, graphics, controls, or sounds. It may be noted too, that the sourced data of conversation-enabled document 144 may include multiple data values for a given variable. For example, if the variable V_Cust_Num in design 130 maps to a Cust_Number column in a customer database, CCM engine 142 may pull in the customer number values for every customer in the database.

The output conversation-enabled document 144 may be in one of several formats, including a CCM system proprietary format. According to one embodiment, conversation-enabled document 144 is not a communication that the end-user (e.g., customer) sees, but is an internal representation (e.g., an in-memory (volatile memory) representation) of all the data and design elements used to render to the supported outputs. Conversation-enabled document 144, for example, may include various components of design 130 and sourced data. Using the example, in which design 130 includes hundreds of correspondence templates, conversation-enabled document 144 can include these templates and the sourced data referenced in or corresponding to variables in those templates. Document 144 can be programmed based on, for example, sourced data to generate the correct letters for any given set of data.

CCM engine 142 may process conversation-enabled document 144 to render conversation-enabled document 144 to a variety of supported formats (e.g., email output, print output, web page output or other output) based on design 130. For example, CCM engine 142 may render a mortgage statement document into an AFP format which can be immediately printed and mailed to the end user, an email that can be immediately emailed to the end user and an HTML file that can be stored as web content so that the end user can access their statement on the enterprise's website. Other output formats may also be supported.

According to one embodiment, CCM engine 142 renders conversation-enabled document 144 as a conversation-enabled interactive document 150, which may be provided or stored as an interactive document container with operative components in a predetermined electronic file format. The interactive document container may comprise a predefined set of files that provides an atomic unit and enables interactive documents to be processed by enterprise applications. The interactive document container may include for example, but is not limited to, a compressed or zipped portion for storing predetermined components.

As will be appreciated, conversation-enabled interactive document 150 may be provided according to a variety of formats. In one embodiment, the conversation-enabled interactive document 150 may be provided as a web-intrinsic interactive document container, as described in U.S. Pat. No. 10,223,339, entitled "Web-Intrinsic Interactive Document," by Pruitt et al., issued Mar. 5, 2019, which is hereby fully incorporated by reference herein, where the web-intrinsic interactive document container further contains conversation component 160.

According to one embodiment then, production server 106 can translate design 130 provided by the designer 125 into an interactive document container, by translating the abstract description into a specific document layout. This translation process can include translating design 130 into specific HTML tags and CSS directives, which are included in the document container. The combination of tag type semantics and CSS style directives creates a document that is an accurate representation of the document's design 130 in a web-intrinsic form. In addition, the interactive functions specified in the abstract design are translated to JavaScript and included in the document container. Support files containing custom data (e.g., variables and sourced data) are included in the document container and written in a format such as JavaScript Object Notation (JSON), for example. Moreover, production server 106 may translate the conversation component (e.g., conversation template and node templates) into a particular format, such as an XML file embodying JSON node template objects. Production server 106 can include the conversation file in the interactive document container as conversation component 160.

In another embodiment, the interactive document may be deployed as superactive document, such as described in U.S. Pat. No. 9,201,854, entitled "Methods and Systems for Creating, Interacting With, and Utilizing a Superactive Document," issued Dec. 1, 2015, which is hereby fully incorporated by reference herein for all purposes, where the superactive document container further includes a conversation component.

In any event, conversation-enabled interactive document 150 may be interacted with by conversation participants (e.g., conversation participants 175) (e.g., customers) and editor-users (e.g., customer-facing employees of an enterprise), such as editor-user 165. Conversation-enabled interactive document 150 may be utilized in various processes implemented by the enterprise. Print and electronic versions of the interactive document may be provided in addition to processing of the interactive document by computer-implemented processes of the enterprise.

The underlying infrastructure of one embodiment of conversation-enabled interactive document 150 is represented by content 152, logic 154, document variables 156, conversation-enabled document data 158, and conversation component 160. Conversation-enabled interactive document 150 may include other components.

Content 152 may include, for example, page templates containing content specified by interactive document page templates of design 130. Content 152 may further include, for example, content objects such as images, audio files or other resources that can be incorporated into pages or conversation steps when the pages or steps are rendered.

Logic 154 can include logic related to pages, such as logic to control which portions of pages are editable, how the page changes as content in the page is edited and other logic.

Document variables 156 include variables specified in design 130 (e.g., variables referenced in content 152, logic 154 or conversation component 160) and included in conversation-enabled interactive document 150.

Conversation-enabled document data 158 may include data values for variables 156. In some embodiments, conversation-enabled document data 158 may include values for variables segregated by customer. For example, conversation-enabled document data 158 may include customer records for multiple customers sourced from enterprise data source 116, data sourced from external data source 122, default values specified in design 130 or other data.

Conversation component 160 is configured to control a conversation interface into conversation-enabled interactive document 150 and to drive conversations (e.g., web chat, SMS based conversation, audio-based conversation or other interactive conversation) with conversation participants. Conversation component 160 may be a representation of conversation template 132, including node templates 135. Conversation component 160 may be embodied in a variety of formats. According to one embodiment, conversation component 160 comprises an XML file that includes a representation of each of the node templates 135 (for example, includes the JSON for each node template 135 in conversation template 132).

Conversation component 160 may specify, for example, conversation prompts, variables (e.g., from variables 156) to which response data received from a conversation participant is to be written, variables (e.g., from variables 156) to pull data for prompts or logic (e.g., variables to pull data from conversation-enabled document data 158 or other sources), data types, messages to provide when particular events occur, rules on responses, validation, routing or other aspects of a conversation. Conversation component 160 may include or reference various content objects (e.g., images, audio files), document variables, data mappings or other objects for use in conversations.

Conversation-enabled interactive document 150 provides conversation and controlled editing experiences and changes based on interactions by conversation participants 175 or editor-user 165. Data that is entered by the conversation participant 175 or editor-user 165 during interactions can also be sent back to a database to be available for future interactions with a customer, for example. For example, data entered by the conversation participant 175 or editor-user 165 may be added to conversation-enabled document data 158.

As discussed above, conversation component 160 can be used to control a conversation interface into conversation-enabled interactive document 150. Such a conversation interface may be provided via any supported conversation channel. Conversation component, according to one embodiment, is conversation platform agnostic. As such, the conversation-enabled document 150, according to some embodiments, can be exposed to heterogeneous conversation platforms, such as various chatbot, voice assistant platforms, social media platforms or other platforms that support automated conversations with end users.

Based on conversation component 160, interactive document system 110 can provide prompts to any supported conversation platform configured to interact with user system 120 (e.g., which may be a telephone, computer system or other user system). Interactive document system 110 can receive conversation responses 180 from the conversation platform, which can be used to create or change conversation-enabled document data 158 that fills variables that have been set in design 130.

The conversation responses 180 and may affect how interactive document system 110 manifests conversation-enabled interactive document 150 to editor-user 165. More particularly, the pages, content or other aspects of conversation-enabled interactive document 150 displayed (e.g., variable values, text, images) to editor-user 165 may be based on variable values set by conversation responses. For example, user responses during a conversation may result in conversation-enabled interactive document 150 being rendered as a particular type of letter template with certain content (e.g., variable values, text, images) populated based on the conversation responses represented in conversation-enabled document data 158.

As editor-user 165 interacts with conversation-enabled interactive document 150, editor-user 165 can create or change conversation-enabled document data 158 that fills variables that have been set in design 130 and change page content that was designated as editable in design 130. For example, an editor-user 165 might enter their name, and begin to personalize a letter to be sent to a customer (e.g., conversation participant 175). In some cases, this may occur after the conversation has terminated.

The editor-user 165 may populate information, and perhaps change some imaging within conversation-enabled interactive document 150, for example. As a result, the conversation-enabled document data 158 or content 152 that is changed as part of the interaction is also stored and filed as part of conversation-enabled interactive document 150.

The way editor-user 165 can change, format or otherwise edit content of conversation-enabled interactive document 150, or otherwise interact with conversation-enabled interactive document 150 is set in the document design process. Conversation-enabled interactive document 150 is then utilized and manipulated by the editor-user 165 in accordance with the design 130. Any actions taken by the editor-user 165 interactively may be dictated by the design 130.

In some embodiments, the edited conversation-enabled interactive document 195 (e.g., conversation-enabled interactive document 150 as changed based on one or more conversations or one or more editing sessions) can be sent back to CCM engine 142 to be rendered in other formats supported by design 130 (e.g., as email, print, or other format).

Turning briefly to FIG. 2, this figure illustrates one embodiment of designing an interactive document page template 200, which can be represented by a corresponding page object in design data store 104. Page template 200 may be associated with usage rules indicating whether the page should appear within a particular document or type of document. Page template 200 can specify components of a page. These components can also be governed by usage rules indicating whether they will appear on a page.

In this example, the document design application provides tools to allow a user to specify design elements (e.g., specify the size and location of design elements (text boxes, images), designate design elements as text objects (e.g., text box 202), controls (e.g., buttons 204, checkboxes, dropdown lists and other controls), or image boxes (e.g., image box 206), specify variables for text boxes (e.g., V_Cust_Num in box 210), variables used in usage rules, variables used to select page content and other aspects of a page. Certain text or image boxes may be designated as non-editable and others as editable. For example, text boxes 212 and 214 may be designated as editable and the others as non-editable.

For various controls, the design application 124 can provide tools to allow the designer to designate output for the controls. Design application 124 can further provide tools to allow the design to associate text boxes, image boxes, controls, pages and other objects with rules. For example, the designer-user 125 may specify a rule for image box 206 that, if the radio button Black is selected, image box 206 will be populated with a first image and if the radio button blue is selected, image box 206 will be populated with a second image. The designer-user 125 may also associate various portions of page template 200 with views, for example, such that control 222 appears when the document is rendered to an editor-user, but not when the document is rendered as an email output.

It can be noted that a document design may include multiple pages and page selection logic used to determine if a particular page will be available in a manifestation of the document. For example, document design 130 may include a page related to providing insurance product information and page selection logic configured to only make the page available when a variable value for a customer indicates that the customer is interested in insurance (V_Cust_Insurance=True). Further, certain information in a page may be populated based on variables. In the example of FIG. 2, the variable V_Insurance_Type may be used to populate part of subject line 205.

The design application 124 provides an authoring tool to allow a designer 125 to specify text for inclusion in text boxes. In one embodiment, designer 125 at designer system 102 may utilize design application 124 to select a text object in a template and invoke generative AI to author text for inclusion in the text box.

As discussed, part of designing a template involves specifying the layout of design elements in a page. Embodiments of the present disclosure can analyze existing documents to import layouts, which can be incorporated into templates used to generate electronic documents.

Figure 3:
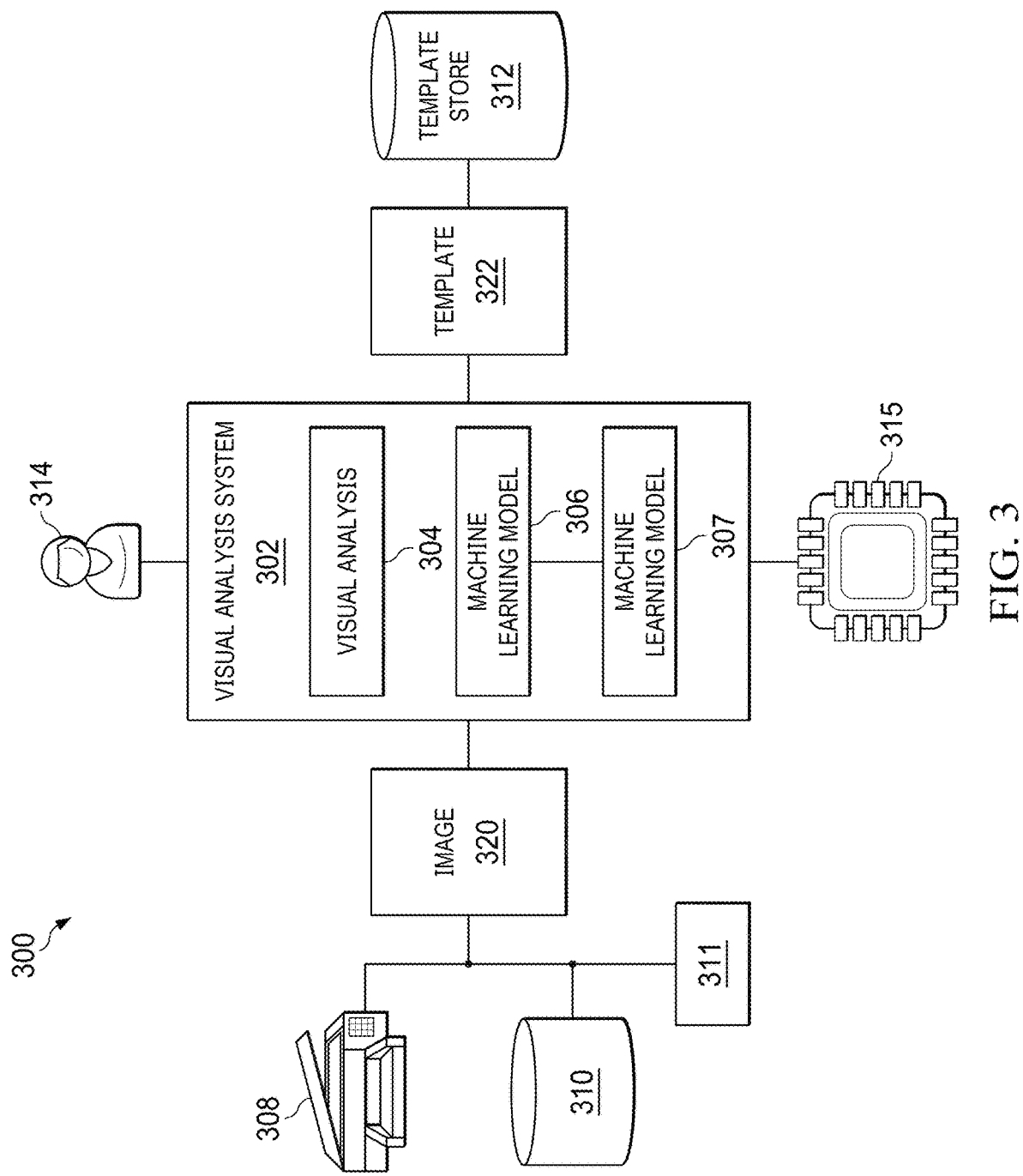
FIG. 3 is a diagrammatic representation of one embodiment for a system for visual analysis.

Turning to FIG. 3, one embodiment of a system 300 for creating templates from existing documents is illustrated. System 300 includes a visual analysis system 302 having a visual analysis component 304 and a machine learning component 306. Visual analysis system 302 is coupled via a local connection or a network to a digital image source—for example, a scanner 308, a content repository 310, or an application 311 that produces digital images—and template repository 312 for storing electronic templates. According to one embodiment, template repository is a portion of a design data store of a CCM system, such as design data store 104. In any case, content repository 310 and template repository 312 can comprise one or more databases, filesystems, or other data storage technologies or combinations thereof, and, in some embodiments, are the same repository.

Visual analysis system 302 is implemented, in some embodiments, by a hardware processor 315 executing software instructions. In some embodiments, visual analysis system 302 is a portion of a design application, such as design application 124. Visual analysis system 302 includes a visual analysis component 304 and a machine learning component 306. Machine learning component 306 includes or can access machine learning model 308. In some embodiments, machine learning model 307 is a cloud-based machine learning model, potentially hosted by a third-party.

In operation, template designer user 314 selects a digital image 320 from which a layout is to be extracted. In various embodiments, template designer user 314, scans a document to produce digital image 320, designates an image from content repository 310 as digital image 320 to use, or produces digital image 320 using application 311. Visual analysis system 302 ingests a digital image 320 from which to extract a layout, extracts the layout, and stores a template 322 having the associated layout to template repository 312.

More particularly, visual analysis component 304 analyzes digital image 320 to determine a layout of design elements. That is, visual analysis system 302 determines the size and position of design elements in digital image 320. In some embodiments, visual analysis system 302 further designates content types for identified design elements (e.g., whether each design element is a text element, an image element, or another type of element supported by the system).

In some embodiments, visual analysis component 304 passes the content corresponding to identified design elements to machine learning component 306. Machine learning model 307, which may comprise multiple models, is trained to label content according to content type (e.g., image, text, or other content type). Thus, machine learning model 307 returns a content type for the design element. If machine learning model 307 cannot recognize the content type, visual analysis system 302 may use a default content type, indicate that the content type is unknown, or take another action with respect to a design element.

In some embodiments, visual analysis component 304 includes tools to allow the template designer user 314 to adjust the layout before or after storing template 322, such as by moving, resizing, deleting, or changing the content type of design elements identified from digital image 320 or by adding additional design elements.

In some embodiments, template 322 can then be further modified to create a page design that specifies editable and viewable text for a page, optional and selectable paragraphs for the page, variables, values for variables or text areas of the page, sources for content of the page, rules for populating content of the page, resource rights for the page, and user rights for the page, among others.

Figure 4A:
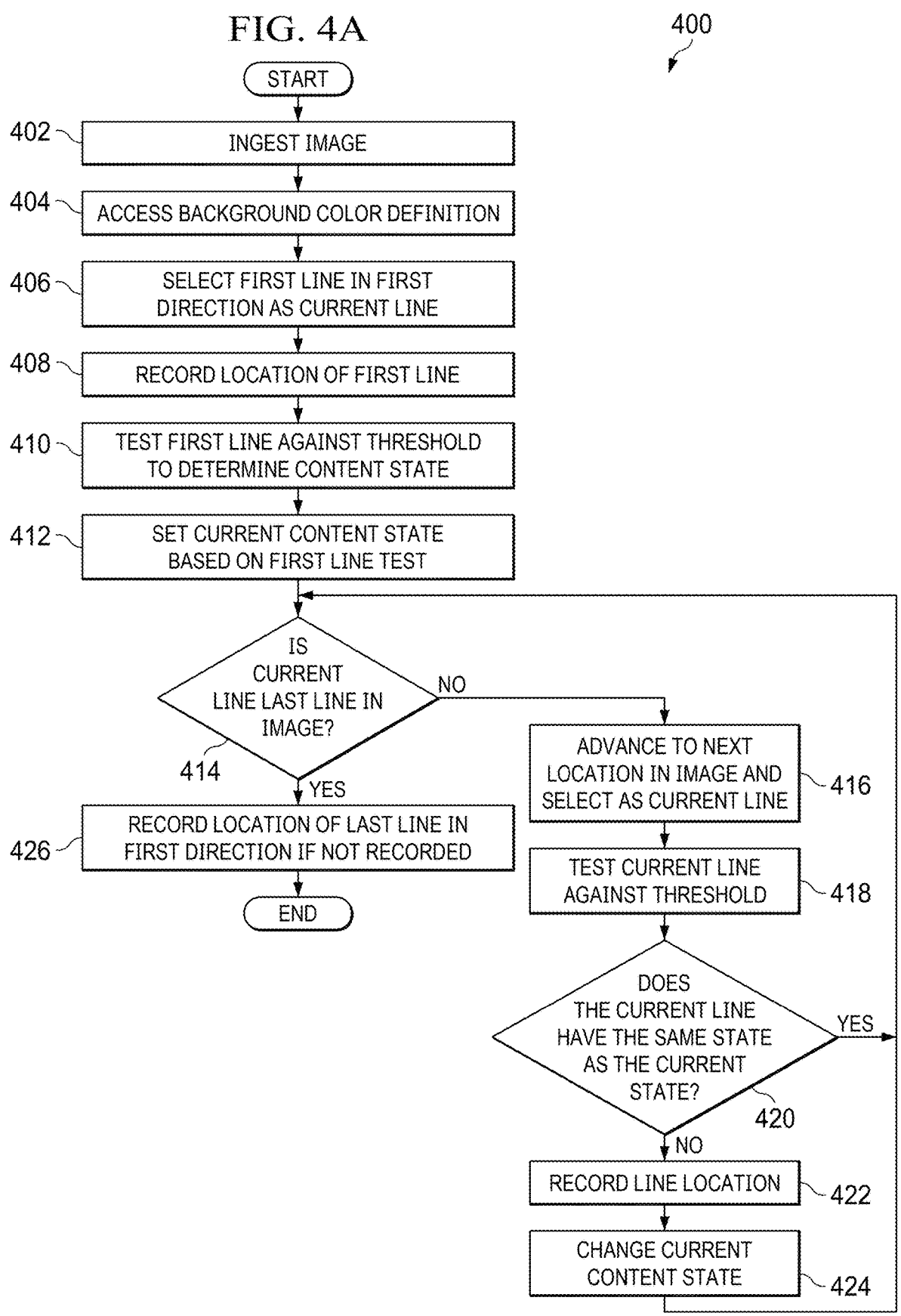
FIG. 4A is a flowchart illustrating a portion of one embodiment of a method for visual analysis.

FIG. 4A, FIG. 4B, and FIG. 4C (collectively FIG. 4) illustrate one embodiment of a method 400 for visual analysis to import a layout into a template. The method 400 of FIG. 4 may be embodied, in some embodiments, as computer program code stored on a non-transitory, computer-readable medium. For the sake of example, the method of FIG. 4 will be discussed in the context of FIG. 3 and FIG. 5A-FIG. 5E (collectively FIG. 5) and FIG. 6.

Visual analysis can include testing lines and areas of pixels against a color value—for example, a background color value-provided by a user, determined algorithmically, or otherwise specified. More particularly, pixels are tested for collisions with content (non-background elements). Visual analysis system tracks a current state is settable based on testing pixels for collisions. The current content state is settable in at least a first state representing a collision with a non-background element (referred to a "non-background state" herein) or a second state indicating no collision with a non-background element (referred to as a "background state" herein).

Content collisions can be identified based on the variance of pixels from the color value. In one embodiment, a variance threshold specifies a minimum number of pixels that must have a minimum variance from the background color. For example, a threshold might specify that at least "x" pixels must be "y" different from the background color to be considered a collision with content (e.g., 10 pixels must be at least 5% different from the background color to be considered a collision with a non-background; at least 70 pixels must be at least 30% different from the background color to be considered a collision). Other variance or color thresholds may be used.

In some embodiments, different thresholds can be used when testing lines and areas. For example, in one embodiment the background definition might specify that, for a test line, at least "x1" pixels must be "y1" different from the background color to be considered a collision with a non-background element, and, for a test area at least "x2" pixels must be "y2" different from the color value. As a more particular example, a background definition might specify that at least 10 pixels must be at least 5% different from the background color for a line to be considered a collision with content and at least 70 pixels must be at least 30% different from the background color for an area to be considered content.

Testing lines involves testing horizontal and vertical lines of pixels. Embodiments of the present disclosure can operate in a variety of orders, such as horizontal-first (pixel rows first) or vertical-first (pixel columns first) order. For the sake of example, processing digital image 500 of FIG. 5 is described using horizontal-first testing.

At step 402, visual analysis system 302 ingests digital image 320 of a document. In some embodiments, this can include converting an existing document (paper or electronic) to a digital image format for analysis.

At step 404, visual analysis system 302 accesses a background color definition that represents the background of the digital image. In some embodiments, the background color definition comprises a color value for the background (e.g., the color value of white for digital image 500) and a variance threshold from a background color. As discussed above, in some embodiments, the variance threshold may be expressed as a minimum number of pixels (e.g., an absolute number or percentage of pixel) and a minimum variance from the background. For example, the variance threshold may specify that at least 10 pixels must be at least 5% different from the background to be considered a collision with a non-background element. In some embodiments, the background color and variance threshold are user configurable.

At step 406, visual analysis system 302 selects a first line of pixels from the digital image as a current test line. Preferably, the first line is a line at the edge of the digital image (the topmost line, the bottommost line, the line that is furthest to the right, the line that is further to left), and works across the image from there. Embodiments of the present disclosure can operate in a horizontal-first or vertical-first order.

In a horizontal-first order, visual analysis system 302 selects a first horizontal line, for example, line 502a as the first test line and sets the first line as the current test line. At step 408, visual analysis system 302 records the location of the current test line (e.g., line 502a) as a content state transition line. In one embodiment, the line location is stored as a row/column number that represents a pixel location in the image. The line location can be stored in other formats as, but not limited to, as a percentage of the image dimension.

At step 408, visual analysis system 302 tests the line for a collision with a non-background object. According to one embodiment, for example, visual analysis system 302 determines the variance of pixels in line 502a from the background color value exceeds the threshold variance. If the variance from the background color value of pixels in the first row exceeds the threshold, visual analysis system 302 sets the current content state to a first state indicating that a collision with a non-background element was detected (a non-background state). If the variance from the background color value does not exceed the threshold variance, visual analysis system 302 sets the current content state to the second state indicating that no collision with a non-background object was detected (a background state). Here, line 502a does not collide with a non-background object and hence, visual analysis system, at step 412 sets the content state to the background state.

Visual analysis system 302 tests each line in the digital image for collision with a non-background object. More particularly, at step 414, visual analysis system 302 determines that line 502a is not the last line in image 500 and, therefore, selects the next line as the current test line (step 416). At step 418, visual analysis system 302 tests the current test line for a collision with non-background. The collision test can be the same as that performed at step 410. At step 420, visual analysis system 302 determines if the current test line has the same state as the current state. If the current test line has the same state as the current state, visual analysis system 302 returns to step 414.

If, at step 420, visual analysis system 302 determines that the current test line has a different content state than the current state, visual analysis system 302 records the location of the current test line as the location of a content state transition line (step 422) and, in some embodiments, the direction of state change and changes the current content state to another state (step 424).

Referring to FIG. 5B, for example, visual analysis system 302 iterates through pixel lines from line 502a to line 502b. When visual analysis system tests pixel line 502b, it determines that test line 502b represents a non-background state, which is different than the current content state (i.e., the background state) determined for line 502a and left unchanged from testing lines between line 502a and line 502b. Accordingly, visual analysis system 302 records the position of test line 502b as the position of a content state transition line (step 422) and changes the current content state to the non-background state (step 424). The process continues until each horizontal line of pixels has been tested through a last line. The last line, if not recorded at step 422 as a content state transition line, can be recorded as a content state transition line at step 426.

Thus, visual analysis system 302 determines that lines 502a, 502b, 502c, 502d, 502e, 502f, 502g, 502h, 502i, 502j, 502k, 502l, 502m are content state transition lines and records their locations. Further, in some embodiments, visual analysis system 302 records the direction of the state change.

Figure 5C:
FIG. 5C is a diagrammatic representation of one embodiment of a digital image with areas in a first direction identified.
Figure 6:
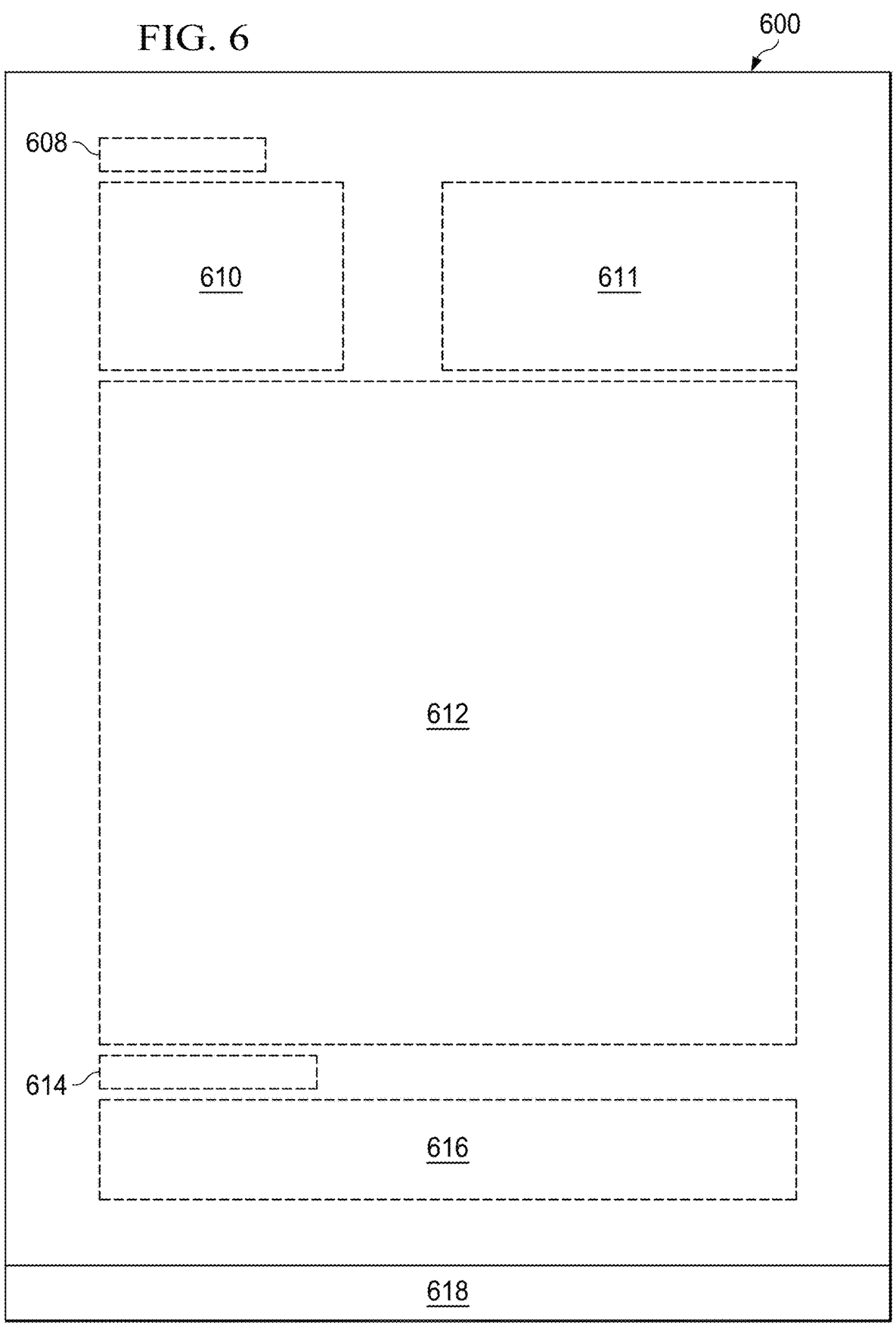
FIG. 6 is a diagrammatic representation of one embodiment of a page template having a layout extracted from a digital image of a document page.

Using the recorded content state transition lines that extend in the first direction, visual analysis system 302 can identify the areas bounded by the lines. As illustrated in FIG. 5C, the content state transition lines 502a, 502b, 502c, 502d, 502e, 502f, 502g, 502h, 502i, 502j, 502k, 502l, 502m divide the digital image into horizontal areas 505a, 505b, 505c, 505d, 505e, 505f, 505g, 505h, 505j, 505k, 505l (generally, areas 505).

Turning to FIG. 4B, visual analysis system 302 iterates through the areas in the first direction, testing lines in a second direction. Again, continuing with the horizontal-first example, visual analysis system 302 iterates through horizontal areas 505, testing vertical lines.

At step 430, visual analysis system 302 selects a first horizontal area 505 for further testing and sets the area as the current area. For example, visual analysis system 302 sets horizontal area 505a as the current area.

At step 432, visual analysis system 302 selects a first line of pixels in the second direction as a test line, where the first line of pixels spans the current area. Preferably, the first line is a line at the edge of the digital image (the topmost line, the bottommost line, the line that is furthest to the right, the line that is further to left), and works across the image from there. Thus, at step 432, visual analysis system 302 selects line 504a (FIG. 5D) as the first line and sets the first line as the current test line. At step 436, visual analysis system 302 records the location of the current test line (e.g., line 504a) as a content state transition line.

At step 436, visual analysis system 302 tests the line for a collision with a non-background object. According to one embodiment, for example, visual analysis system 302 determines the variance of pixels in line 504a from the background color value exceeds the threshold variance. If the variance from the background color value of pixels in the first row exceeds the threshold, visual analysis system 302 sets the current content state to a first state indicating that a collision with a non-background element was detected (a non-background state). If the variance from the background color value does not exceed the threshold variance, visual analysis system 302 sets the current content state to the second state indicating that no collision with a non-background object was detected (a background state). Here, line 504a does not collide with a non-background object and hence, visual analysis system, at step 438 sets the content state to the background state.

For the selected area in the first direction, visual analysis system 302 tests each line in a second direction for collision with a non-background object. More particularly, at step 440, visual analysis system 302 determines that line 504a is not the last line in horizontal area 505a and, therefore, selects the next line as the current test line (step 442). At step 444, visual analysis system 302 tests the current test line for a collision with non-background. The collision test can be the same as that performed at step 436.

At step 445, visual analysis system 302 determines if the current test line has the same content state as the current state. If the current test line has the same state as the current state, visual analysis system 302 returns to step 440. If the current test line has a different state than the current state, visual analysis system 302 records the location of the current test line as the location of a content state transition line (step 446) and, in some embodiments, the direction of state change, and changes the current content state to another state (step 448).

The process continues until each vertical line of pixels that spans the selected area has been tested through a last line. The last line, if not recorded at step 448 as a content state transition line, can be recorded as a content state transition line at step 450.

Figure 5D:
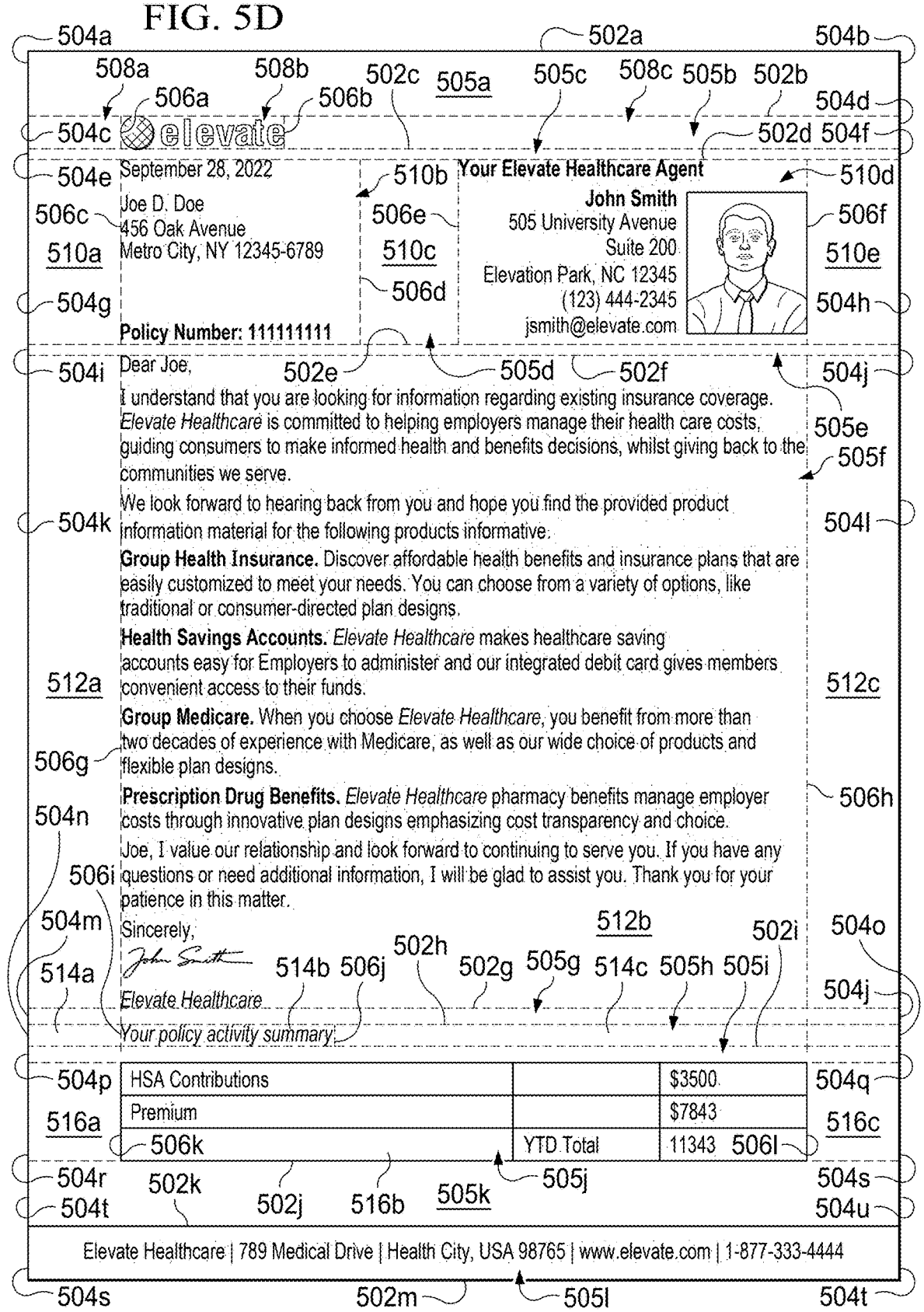
FIG. 5D is a diagrammatic representation of one embodiment of a digital image with content state transition lines in a second direction and areas of interest identified.
Figure 5E:
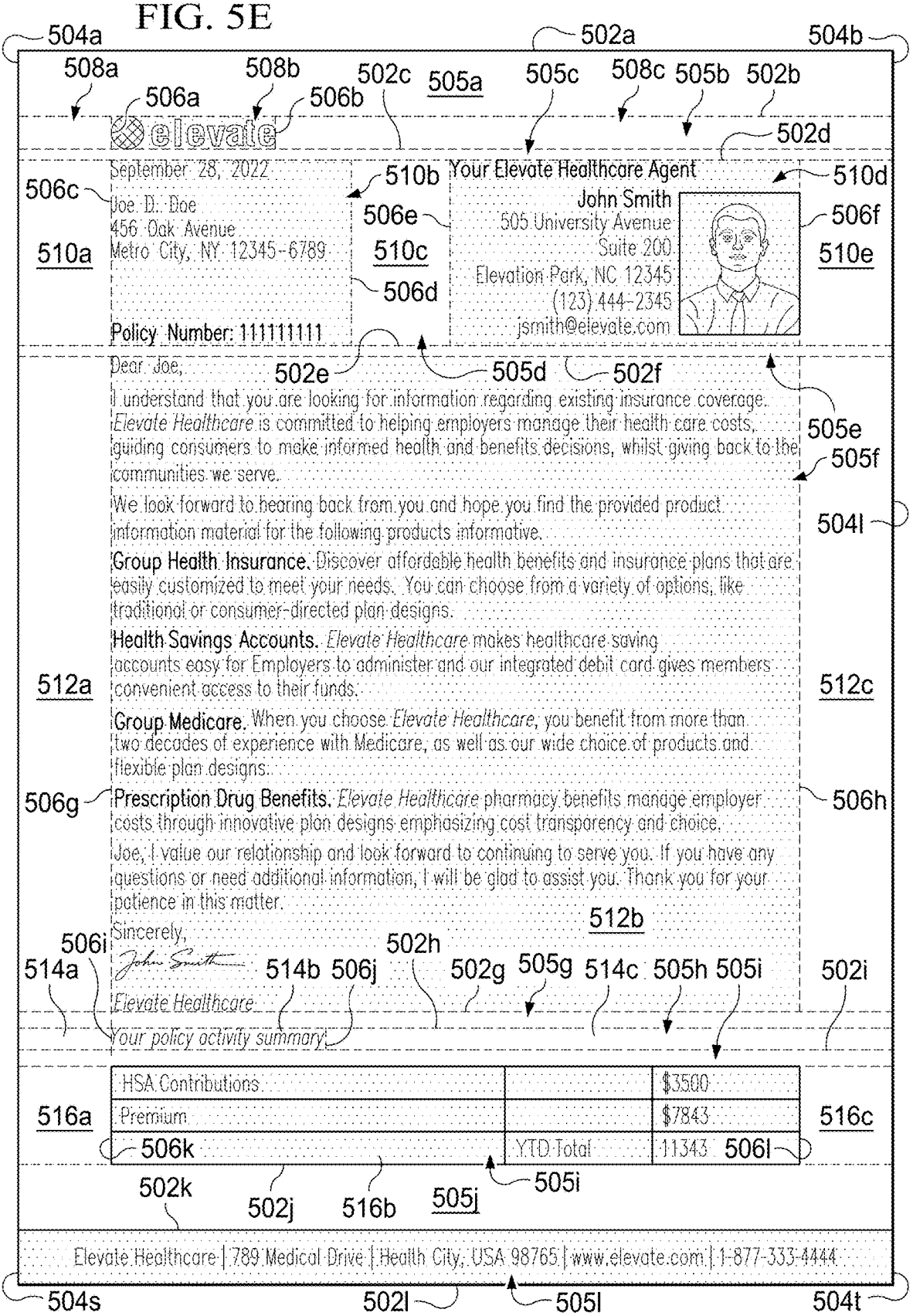
FIG. 5E is a diagrammatic representation one embodiment of a digital image with content areas.

Using the example of testing area 505a from FIG. 5C, and with reference to FIG. 5D, visual analysis system 302 begins testing area 505a at line 504a and iterates through the pixel lines to line 504b. Since there is no state change between line 504a and 504b, lines 504a and 504b are the only lines recorded as content state transition lines from the analysis of area 505a.

At step 452, visual analysis system 302 determines if there are additional areas in the first direction to test and, if so, selects the next area (step 454). For example, visual analysis system 302 selects area 505b as the current area (step 430). Visual analysis system 302 selects line 504c as the current test line for the current test line for the current area (step 432), records the location of line 504c (step 434), tests line 504c against the threshold to determine a content state (step 436) and sets the current content state based the test of line 504c (e.g., sets the state to background).

For the selected area in the first direction, visual analysis system 302 tests each line in a second direction for collision with a non-background object. More particularly, at step 440, visual analysis system 302 determines that line 504c is not the last line in horizontal area 505b and, therefore, selects the next line as the current test line (step 442). At step 444, visual analysis system 302 tests the current test line for a collision with non-background.

At step 445, visual analysis system 302 determines if the current test line has the same content state as the current state. If the current test line has the same state as the current state, visual analysis system 302 returns to step 440. If the current test line has a different state than the current state, visual analysis system 302 records the location of the current test line as the location of a content state transition line (step 446) and, in some embodiments, the direction of state change, and changes the current content state to another state (step 448).

The process continues until each vertical line of pixels that spans the selected area has been tested through a last line. The last line, if not recorded at step 448 as a content state transition line, can be recorded as a content state transition line at step 450.

Thus, visual analysis system 302 iterates through pixel lines from line 504c to line 506a. When visual analysis system tests pixel line 506a, it determines that test line 506a represents a non-background state, which is different than the current content state (i.e., the background state) determined for line 504c and left unchanged from testing lines between line 504c and line 506c. Accordingly, visual analysis system 302 records the position of test line 506c as the position of a content state transition line (step 446) and changes the current content state to the non-background state (step 448). The process continues until each vertical line of pixels has been tested through a last line 504d. The last line, if not recorded at step 446 as a content state transition line, can be recorded as a content state transition line at step 450. Thus, in processing area 505b, visual analysis system 302 can identify test lines 504c, 506a, 506b, and 504d as content state transition lines.

The process can continuate for the remainder of the areas 505 to identify lines 504e and 504f (area 505c); lines 504g, 506c, 506d, 506e, 506f, 504h as the vertical content transition (area 505d); lines 504i and 504j as the vertical content state transition lines (area 505e); lines 504k, 506g, 506h, 504l as the vertical content state transition lines (area 505f); lines 504m and 504n as the vertical content state transition lines (area 505g); lines 504n, 506i, 506j, 504o as the vertical content state transition lines (area 505h); lines 504p and 504q as the vertical content state transition lines (area 505i); lines 504r, 506k, 506l, 504s as the vertical content state transition lines (area 505j); lines 504t and 504u as the vertical content state transition lines (area 505k); and lines 504s and 504t as the vertical content state transition lines (area 505l).

The processing described above results, in one embodiment, in a set of content state transition lines. Turning to FIG. 4C, visual analysis system 302, at step 460, determines the intersections of the content state transition lines determined from analyzing digital image 500 and creates areas of interest, which are defined by the intersections (areas bounded by intersecting content transition lines). In FIG. 5C, the areas of interest include area 505a; areas 508a, 508b, 508c from area 505b; area 505c; areas 510a, 510b, 510c, 510e from area 505d; area 505e; areas 512a, 512b, 512c from area 505*f*; area 505*g*; areas 514*a*, 514*b*, 514*c*, from area 505*h*; area 505*i*; area 516*a*, 516*b*, 516*c* from area 505*j*; area 505*k*; area 505*l*.

At step 462, visual analysis system 302 selects, as a test area, a first area of interest from the areas of interest determined from the intersections.

At step 466, visual analysis system 302 tests the current test area to determine if the area represents content or background. According to one embodiment, visual analysis system 302 tests all the pixels (or some selected number of pixels) from the current test area against the variance threshold specified in the background color definition.

In another embodiment, visual analysis system provides the image data for the area of interest (e.g., a portion of the image, the entire image with the area of interest specified) to a machine learning model that is trained to identify content areas and, in some embodiments, the type of content area. In such an embodiment, the machine learning model can return an indication of whether the area of interest is a content area and, in some embodiments, the type of content area (e.g., text, image, or other content area).

Based on a determination that the test area exceeds the threshold or otherwise represents content rather than background (step 468), visual analysis system 302 stores the test area as a content area (step 470). For example, visual analysis system 302 stores the line definitions for the lines bounding the test area as the definition of a content area.

If the test area represents background, the test area can be discarded (step 472). As indicated at step 474 and step 476, visual analysis system 302 can continue testing areas of interest until all the areas of interest have been tested. Using the example of FIG. 5D, areas 508*b*, 510*b*, 510*d*, 512*b*, 514*b*, 516*b*, and 505*h* are identified as content areas because the pixel values of pixels in those areas exceed the specified threshold for an area to be considered a content area.

At step 478, visual analysis system 302 converts the identified content areas into design elements of a template, such as a page template used by a CCM system. This may include, for example, creating an electronic template 600 (FIG. 6) with the sizes and positions of each of the content areas defined according to the page modeling language of the system in which the template is to be used. For example, the position and size of a content area the content area may be transformed from the format used to record the test lines to absolute units or relative units of the page modeling language used by the system. Some example units include inches, centimeters, point (pt), pica (pc), em units, px units, percentage of page, and ex units.

Thus, for example, visual analysis system 302 generates a template 600 having design element 608 determined from content area 508*b*, design element 610 determined from content area 510*b*, design element 611 determined from content area 510*c*, design element 612 determined from content area 512*b*, design element 614 determined from content area 514*a*, design element 616 determined from content area 516*b*, and design element 618 determined from content area 505*h*. The layout of template 600 includes, for example, the sizes and positions of the design element boxes and associated design element types for the design elements.

In one embodiment, each of these design elements determined from digital image 500 is stored as a text design element. In another embodiment, visual analysis system 302 sends the content associated to the content areas for classification by a machine learning model as an image area, text area, or another type of content area supported by the system. Thus, in some embodiments, the design element type of a design element corresponding to a content area extracted from a digital image is provided by a machine learning model.

At step 480, visual analysis system 302 stores the template in the template repository 312.

FIG. 4 is merely illustrative and the disclosed subject matter is not limited to the ordering or number of steps illustrated. Embodiments may implement additional steps or alternative steps, omit steps, or repeat steps.

In some embodiments, visual analysis system 302 tracks the direction of content state changes at content state transition lines. By using the direction of state changes, visual analysis system 302, in some embodiments, can reduce or eliminate testing of areas of interest. For example, by tracking that i) content state transition line 502*f* represents a transition, moving down the page, from a background state to a non-background state, ii) content transition line 502*g* represents a transition, moving down the page, from a non-background state to a background state, iii) content state transition line 506*g* represents a transition, moving left-to-right, from a background state to a non-background state, and iv) content state transition line 506*h* represents a transition, moving left-to-right, from a non-background state to a background state, visual analysis system 302 can infer that the area bounded by content state transition lines 502*f*, 502*g*, 506*g*, 506*h* is a content area.

Those skilled in the relevant art will appreciate that embodiments of the present invention can be implemented or practiced with a variety of computer system configurations including, without limitation, multi-processor systems, network devices, mini-computers, mainframe computers, data processors, and the like. The invention can be embodied in a general-purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description, including the Summary and Abstract, is intended to describe illustrative embodiments, features and functions to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A computer-implemented method for automated visual analysis of documents to generate digital templates, the method comprising:
   accessing a digital image of a document page;
   accessing a background color definition;

tracking a current content state for analyzing the digital image, the current content state having a plurality of potential states comprising:
- a first state indicating a collision with a non-background; and
- a second state indicating no collision with the non-background;

testing a first plurality of test lines of pixels from the digital image against the background color definition to identify, from the first plurality of test lines of pixels, a first plurality of content state transition lines, each line in the first plurality of test lines of pixels extending in a first direction;

testing a second plurality of test lines of pixels from the digital image against the background color definition to identify, from the second plurality of test lines of pixels, a second plurality of content state transition lines, each line in the second plurality of test lines of pixels extending in a second direction;

identifying intersections between the first plurality of content state transition lines and the second plurality of content state transition lines;

determining an area of interest bounded by intersecting lines from the first plurality of content state transition lines and the second plurality of content state transition lines;

processing the area of interest to determine that the area of interest represents content; and based on a determination that the area of interest represents content, storing the area of interest as a design element of a digital page template.

2. The computer-implemented method of claim 1, further comprising selecting a first area of the digital image, the first area bounded by a first line in the first direction and a second line in the first direction, the first line in the first direction and the second line in the first direction being adjacent lines from the first plurality of content state transition lines, wherein the second plurality of test lines of pixels extend from the first line in the first direction to the second line in the first direction.

3. The computer-implemented method of claim 2, wherein the area of interest is a sub-area of the first area.

4. The computer-implemented method of claim 1, wherein determining that the area of interest represents content comprises testing pixel values from the area of interest against the background color definition.

5. The computer-implemented method of claim 1, wherein:
- the background color definition comprises a color value;
- testing the first plurality of test lines of pixels from the digital image against the background color definition to identify, from the first plurality of test lines of pixels, the first plurality of content state transition lines, comprises:
  - for each of the first plurality of test lines of pixels:
    - determining a respective variance from the color value; and
    - determining a respective content state based on the respective variance from the color value determined for that line from the first plurality of test lines; and
  - for each of the first plurality of test lines of pixels for which the respective content state determined for that line from the first plurality of test lines differs from the current content state:
    - selecting that line from the first plurality of test lines for inclusion in the first plurality of content state transition lines; and
    - changing the current content state.

6. The computer-implemented method of claim 5, wherein testing the second plurality of test lines of pixels against the background color definition to identify, from the second plurality of test lines of pixels, the second plurality of content state transition lines, comprises:
- for each of the second plurality of test lines of pixels:
  - determining a respective variance from the color value; and
  - determining a respective content state based on the respective variance from the color value determined for that line from the second plurality of test lines; and
- for each of the second plurality of test lines of pixels for which the respective content state determined for that line from the second plurality of test lines differs from the current content state:
  - selecting that line from the second plurality of test lines for inclusion in the second plurality of content state transition lines; and
  - changing the current content state.

7. The computer-implemented method of claim 6, wherein the background color definition comprises a background color value and wherein determining that the area of interest represents content comprises:
- determining a color variance of pixels in the area of interest from the background color value; and
- determining that the color variance of pixels in the area of interest exceeds a threshold.

8. The computer-implemented method of claim 1, wherein determining that the area of interest represents content comprises inputting the area of interest to a machine learning model trained to identify the content.

9. The computer-implemented method of claim 1, wherein the first direction is horizontal, and the second direction is vertical.

10. The computer-implemented method of claim 1, wherein the first direction is vertical, and the second direction is horizontal.

11. A computer program product for automated visual analysis of documents to generate digital templates, comprising a non-transitory, computer-readable medium storing thereon computer-executable instructions, the computer-executable instructions comprising instructions for:
- accessing a digital image of a document page;
- accessing a background color definition;
- tracking a current content state for analyzing the digital image, the current content state having a plurality of potential states comprising:
  - a first state indicating a collision with a non-background; and
  - a second state indicating no collision with the non-background;
- testing a first plurality of test lines of pixels from the digital image against the background color definition to identify, from the first plurality of test lines of pixels, a first plurality of content state transition lines, each line in the first plurality of test lines of pixels extending in a first direction;
- testing a second plurality of test lines of pixels from the digital image against the background color definition to identify, from the second plurality of test lines of pixels, a second plurality of content state transition lines, each line in the second plurality of test lines of pixels extending in a second direction;
identifying intersections between the first plurality of content state transition lines and the second plurality of content state transition lines;
determining an area of interest bounded by intersecting lines from the first plurality of content state transition lines and the second plurality of content state transition lines;
processing the area of interest to determine that the area of interest represents content; and
based on a determination that the area of interest represents content, storing the area of interest as a design element of a digital page template.

12. The computer program product of claim 11, wherein the computer-executable instructions further comprise instructions for selecting a first area of the digital image, the first area bounded by a first line in the first direction and a second line in the first direction, the first line in the first direction and the second line in the first direction being adjacent lines from the first plurality of content state transition lines, wherein the second plurality of test lines of pixels extend from the first line in the first direction to the second line in the first direction.

13. The computer program product of claim 12, wherein the area of interest is a sub-area of the first area.

14. The computer program product of claim 11, wherein determining that the area of interest represents content comprises testing pixel values from the area of interest against the background color definition.

15. The computer program product of claim 11, wherein:
the background color definition comprises a color value;
testing the first plurality of test lines of pixels from the digital image against the background color definition to identify, from the first plurality of test lines of pixels, the first plurality of content state transition lines, comprises:
for each of the first plurality of test lines of pixels:
determining a respective variance from the color value; and
determining a respective content state based on the respective variance from the color value determined for that line from the first plurality of test lines; and
for each of the first plurality of test lines of pixels for which the respective content state determined for that line from the first plurality of test lines differs from the current content state:
selecting that line from the first plurality of test lines for inclusion in the first plurality of content state transition lines; and
changing the current content state.

16. The computer program product of claim 15, wherein testing the second plurality of test lines of pixels against the background color definition to identify, from the second plurality of test lines of pixels, the second plurality of content state transition lines, comprises:
for each of the second plurality of test lines:
determining a respective variance from the color value; and
determining a respective content state based on the respective variance; and
for each of the second plurality of test lines of pixels for which the respective content state determined for that line from the second plurality of test lines differs from the current content state:
selecting that line from the second plurality of test lines for inclusion in the second plurality of content state transition lines; and
changing the current content state.

17. The computer program product of claim 16, wherein the background color definition comprises a background color value and wherein determining that the area of interest represents content comprises:
determining a color variance of pixels in the area of interest from the background color value; and
determining that the color variance of pixels in the area of interest exceeds a threshold.

18. The computer program product of claim 11, wherein determining that the area of interest represents content comprises inputting the area of interest to a machine learning model trained to identify the content.

19. The computer program product of claim 11, wherein the first direction is horizontal, and the second direction is vertical.

20. The computer program product of claim 11, wherein the first direction is vertical, and the second direction is horizontal.

21. A system of automated visual analysis of documents to generate digital templates, comprising:
a digital image source;
a template store;
a processor coupled to the digital image source and the template store;
a computer memory coupled to the processor, the computer memory storing:
a background color definition;
computer-executable instructions, the computer-executable instructions executable by the processor and comprising instructions for:
receiving a digital image of a document page from the digital image source;
accessing the background color definition;
tracking a current content state for analyzing the digital image, the current content state having a plurality of potential states comprising:
a first state indicating a collision with a non-background; and
a second state indicating no collision with the non-background;
testing a first plurality of test lines of pixels from the digital image against the background color definition to identify, from the first plurality of test lines of pixels, a first plurality of content state transition lines, each line in the first plurality of test lines of pixels extending in a first direction;
testing a second plurality of test lines of pixels from the digital image against the background color definition to identify, from the second plurality of test lines of pixels, a second plurality of content state transition lines, each line in the second plurality of test lines of pixels extending in a second direction;
identifying intersections between the first plurality of content state transition lines and the second plurality of content state transition lines;
determining an area of interest bounded by intersecting lines from the first plurality of content state transition lines and the second plurality of content state transition lines;
processing the area of interest to determine that the area of interest represents content; and based on a determination that the area of interest represents content, storing the area of interest as a design element of a page template in the template store.

* * * * *